United States Patent
Lim et al.

(10) Patent No.: US 9,477,014 B2
(45) Date of Patent: Oct. 25, 2016

(54) PROTECTIVE FILM AND POLARIZING PLATE INCLUDING THE SAME

(71) Applicant: LG CHEM, LTD., Seoul (KR)

(72) Inventors: Yi-Rang Lim, Daejeon (KR); Hwa-Sub Shim, Daejeon (KR); Jun-Wuk Park, Daejeon (KR); Nam-Jeong Lee, Daejeon (KR); Kyoung-Won Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/118,518

(22) PCT Filed: May 31, 2013

(86) PCT No.: PCT/KR2013/004850
§ 371 (c)(1),
(2) Date: Nov. 18, 2013

(87) PCT Pub. No.: WO2014/148684
PCT Pub. Date: Sep. 25, 2014

(65) Prior Publication Data
US 2015/0160378 A1 Jun. 11, 2015

(30) Foreign Application Priority Data

Mar. 22, 2013 (KR) .................. 10-2013-0031161
May 31, 2013 (KR) .................. 10-2013-0062719

(51) Int. Cl.
*G02B 1/14* (2015.01)
*G02B 5/30* (2006.01)

(52) U.S. Cl.
CPC ............... *G02B 1/14* (2015.01); *G02B 5/305* (2013.01); *G02B 5/3033* (2013.01); *Y10T 428/265* (2015.01); *Y10T 428/31511* (2015.04); *Y10T 428/31576* (2015.04); *Y10T 428/31667* (2015.04); *Y10T 428/31928* (2015.04)

(58) Field of Classification Search
CPC ...... G02B 1/14; G02B 5/3033; G02B 5/305; Y10T 428/265; Y10T 428/31511; Y10T 428/31551; Y10T 428/31576; Y10T 428/31667; Y10T 428/31855; Y10T 428/31928
USPC .......................................................... 428/1.5
See application file for complete search history.

(56) References Cited

U.S. PATENT DOCUMENTS

| | | | |
|---|---|---|---|
| 2005/0249932 A1* | 11/2005 | Wang et al. | 428/219 |
| 2006/0286382 A1* | 12/2006 | Anzures et al. | 428/411.1 |
| 2008/0100780 A1* | 5/2008 | Suzuki et al. | 349/96 |
| 2011/0019275 A1 | 1/2011 | Suzuki | |
| 2011/0117339 A1 | 5/2011 | Baek et al. | |
| 2012/0164456 A1 | 6/2012 | Seo et al. | |
| 2013/0299070 A1 | 11/2013 | Kawamura | |

FOREIGN PATENT DOCUMENTS

| | | |
|---|---|---|
| JP | 1990-040601 A | 2/1990 |
| JP | 2006-292939 A | 10/2006 |
| JP | 2011-516298 A | 5/2011 |
| JP | 2012-063773 A | 3/2012 |
| JP | 4950357 B1 | 3/2012 |
| JP | 2012-126229 A | 6/2012 |
| KR | 1020080024452 A | 3/2008 |
| KR | 1020120030937 A | 3/2012 |
| KR | 1020120078019 A | 7/2012 |

* cited by examiner

*Primary Examiner* — Thao T Tran
(74) *Attorney, Agent, or Firm* — Dentons US LLP

(57) ABSTRACT

The present invention relates to a protective film including: a transparent film, a coating layer formed on one surface of the transparent film, and a primer layer formed on the other surface of the transparent film, wherein the coating layer is formed using a coating composition including a first polymer resin, a first cross-linking agent and first water dispersible particles, and the primer layer is formed using a primer composition including a second polymer resin and second water dispersible particles, as well as including a second cross-linking agent in an amount, including 0% by weight, and lower than that of the first cross-linking agent, and a polarizing plate including the same.

15 Claims, No Drawings

PROTECTIVE FILM AND POLARIZING PLATE INCLUDING THE SAME

This application is a national stage application of International Application No. PCT/KR2013/004850, filed on May 31, 2013, which claims priority to and the benefit of Korean Patent Application Nos. 10-2013-0031161, filed Mar. 22, 2013, and 10-2013-0062719, filed May 31, 2013, in the Korean Intellectual Property Office, the entire contents of which are incorporated herein by reference.

TECHNICAL FIELD

The present invention relates to a protective film including a coating layer and a primer layer, and a polarizing plate including the same.

BACKGROUND ART

Since information societies are now a reality, a large number of displays, such as liquid crystal displays (LCDs), plasma display panels (PDPs), electrophoretic displays (EPDs), and the like, are being developed or commercialized, and indoor displays are continuously being increasing in size and decreased in thickness, while portable outdoor displays are being miniaturized and lightened. In order to improve functionality of the displays, various kinds of optical films have been used.

Materials used for the optical films generally need to have properties such as high degrees of light transmittancy, optical isotropy, non-defect containing surfaces, high heat and moisture resistance properties, high degrees of ductility, high degrees of surface hardness, low rates of shrinkage, ease of processability and the like.

In a polarizing plate, as a protective film for protecting a polarizer formed of a polyvinyl alcohol material, a triacetyl cellulose (TAC) film having properties such as high degrees of light transmittancy, optical isotropy, non-defect containing surfaces, and the like, has been generally used on one surface or both surfaces of the polarizer. However, since triacetyl cellulose (TAC) films are vulnerable to heat and moisture, in the case of the long-term use of such films under conditions of high temperature and moisture, defects such as a light leakage phenomenon in which an excessive amount of light is leaked from edges of the film due to a lowering in a degree of polarization and moisture degradation, or the like, may be generated, to degrade durability.

Thus, protective films formed of various materials, capable of replacing the triacetyl cellulose (TAC) film have been being developed, and for example, a method of using polyethylene terephthalate (PET), cycloolefin polymer (COP), an acrylic film, and the like, alone or in combination, has been suggested. In particular, the acrylic film is known to have advantages in terms of price, as well as having optical properties and durability.

Meanwhile, as an adhesive used to attach a protective film to a polarizer, a aqueous or non-aqueous adhesive is commonly used. However, since the acrylic film has a high degree of surface friction force, a sufficient degree of adhesion between the polarizer and the film may not be ensured, even in the case of using the adhesive described above.

In addition, due to high surface friction force of the acrylic film, a blocking phenomenon in which film surfaces are in contact with and adhered to each other may be generated during or after the winding of the acrylic film. In order to solve the defect, although a method of filling a film with a small amount of rubber particles or inorganic particles at the time of forming the film has been suggested, such a film is not suitable for being used as an optical film, due to disadvantages thereof such as a lowering in transparency of the film in accordance with an increase in haze, a degradation in stretchability thereof and the like.

Meanwhile, if necessary, an optical film generally includes a surface coating layer in order to complement deficient properties due to inherent characteristics of a material thereof and to realize additionally required display functions. In particular, in a case in which the optical film is disposed in an outermost portion of a display, it may be significantly important to impart functionality such as anti-glare, anti-reflection or hard coating properties to the surface coating layer.

However, when such a surface coating layer is formed on a surface of the polarizing plate, an acrylic film may not be coated on the surface due to insufficient solvent resistance thereof and may be disadvantageously melted.

Therefore, the development of a protective film, enabling a surface coating layer thereof to be easily formed and having slip properties suitable for a roll-to-roll process performed during the production of a polarizing plate, as well as having excellent durability and transparency and high levels of adhesion with respect to a polarizer, has been demanded.

DISCLOSURE

Technical Problem

An aspect of the present invention provides a protective film having excellent blocking resistance and slip properties and high levels of adhesion with respect to a surface coating layer thereof, as well as having excellent durability and transparency and high levels of adhesion with respect to a polarizer, and a polarizing plate including the same.

Technical Solution

According to an aspect of the present invention, there is provided a protective film including: a transparent film; a coating layer formed on one surface of the transparent film; and a primer layer formed on the other surface of the transparent film, wherein the coating layer is formed using a coating composition including a first polymer resin, a first cross-linking agent and first water dispersible particles, and the primer layer is formed using a primer composition including a second polymer resin and second water dispersible particles, as well as including a second cross-linking agent in an amount, including 0% by weight, and lower than that of the first cross-linking agent.

According to another aspect of the present invention, there is provided a polarizing plate including: a polarizer; and the protective film on both surfaces of the polarizer.

According to another aspect of the present invention, there is provided an image display including the polarizing plate.

Advantageous Effects

A protective film according to an embodiment of the present invention includes a primer layer, such that the protective film can have excellent adhesion with respect to films formed of various materials, in particular, an acrylic film, as well as having high durability and transparency.

In addition, a protective film according to an embodiment of the present invention includes a coating layer, such that the protective film can have excellent blocking resistance and slip properties, thereby being suitable for a roll-to-roll process performed during the production of a polarizing plate.

Further, a polarizing plate according to an embodiment of the present invention includes the coating layer, such that the polarizing plate can have excellent solvent resistance and high levels of adhesion with respect to a surface coating layer, thereby enabling a surface coating layer having functionality such as anti-glare and low reflection properties and the like, to be easily formed.

BEST MODE

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

A protective film according to an embodiment of the present invention includes a transparent film, a coating layer formed on one surface of the transparent film, and a primer layer formed on the other surface of the transparent film. The coating layer is formed using a coating composition including a first polymer resin, a first cross-linking agent and first water dispersible particles, and the primer layer is formed using a primer composition including a second polymer resin and second water dispersible particles, as well as including a second cross-linking agent in an amount, including 0% by weight and lower than that of the first cross-linking agent.

In particular, in the embodiment of the present invention, the second cross-linking agent is included in an amount corresponding to 85% or less, preferably, 50% or less, of the first cross-linking agent. That is, the primer composition according to the embodiment of the present invention may not include the second cross-linking agent, and in the case of including the second cross-linking agent, the second cross-linking agent is included in an amount lower than that of the first cross-linking agent. Here, when the amount of the second cross-linking agent satisfies the numerical range based on the amount of the first cross-linking agent, the coating layer and the primer layer have excellent coating and slip properties and high levels of adhesion, thereby enabling a functional surface coating layer to be easily formed. In addition, it may be advantageous in terms of manufacturing costs and process, leading to improvements in productivity.

Meanwhile, in the protective film according to the embodiment of the present invention, the coating composition may include, for example, 1 to 30 parts by weight of the first polymer resin, 0.5 to 6 parts by weight of the first cross-linking agent, 0.1 to 3 parts by weight of the first water dispersible particles and the remainder of water, with respect to 100 parts by weight of the coating composition.

In addition, in the protective film according to the embodiment of the present invention, the primer composition may include, for example, 1 to 20 parts by weight of the second polymer resin, 0.1 to 3 parts by weight of the second water dispersible particles and the remainder of water, with respect to 100 parts by weight of the primer composition.

In the specification, 'remainder' refers to the remainder parts by weight, except for the parts by weight of the first polymer resin, the first cross-linking agent, the first particles, and selectively includable elements, based on 100 parts by weight of the overall coating composition. That is, the overall content of the coating composition becomes 100 parts by weight by adding water thereto, after adding the first polymer resin, the first cross-linking agent, the first particles and the selectively includable elements thereto.

Alternatively, in the specification, 'remainder' refers to the remainder parts by weight, except for the parts by weight of the second polymer resin, the second particles, and selectively includable elements, based on 100 parts by weight of the overall primer composition. That is, the overall content of the primer composition becomes 100 parts by weight by adding water thereto, after adding the second polymer resin, the second particles and the selectively includable elements, for example, the second cross-linking agent, thereto.

Meanwhile, the first polymer resin included in the coating composition is provided to ensure adhesion between the protective film and the surface coating layer, and may be included in an amount of 1 to 30 parts by weight, 5 to parts by weight, or 6 to 20 parts by weight, with respect to 100 parts by weight of the coating composition. When the amount of the first polymer resin included in the coating composition satisfies the numerical range, a sufficient degree of adhesion with respect to the surface coating layer may be obtained due to superior solvent resistance. Moreover, a smooth leveling operation may be performed during a coating process and storage stability of a coating liquid may be excellent.

Furthermore, the second polymer resin included in the primer composition is provided to improve adhesion with respect to a polarizer, and may be included in an amount of 1 to 20 parts by weight or 3 to 10 parts by weight, with respect to 100 parts by weight of the primer composition. When the amount of the second polymer resin satisfies the numerical range, the primer layer formed using the primer composition may have high levels of adhesion and a leveling operation thereof may be facilitated during a coating process, thereby resulting in excellent coating properties.

In the protective film according to the embodiment of the present invention, the first polymer resin and the second polymer resin may be the same type or different types and are not particularly limited thereto.

For example, the first polymer resin and/or the second polymer resin may be a polyurethane resin, an acrylic resin or a combination thereof.

The polyurethane resin may be formed through a reaction between a polyol and an isocyanate. In this case, the polyol may be a polyester polyol, a polyether polyol, a polycarbonate polyol, or the like.

Here, the polyester polyol may be obtained by reacting a polybasic acid component with a polyol component, representatively. In this case, the polybasic acid component may be, for example, an aromatic dicarboxylic acid such as orthophthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, tetrahydrophthalic acid or the like; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, itaconic acid or the like; an alicyclic dicarboxylic acid such as hexahydrophthalic acid, tetrahydrophthalic acid, 1,3-cyclohexane dicarboxylic acid, 1,4-cyclohexane dicarboxylic acid or the like; or a reactive derivative thereof such as an acid anhydride, an alkyl ester, an acid halide, or a combination of two or more thereof may be used therefor.

In addition, the polyol component is not particularly limited, as long as it has two or more hydroxyl groups within a molecule, and any appropriate polyol may be used therefor. For example, the polyol may be at least one selected from a group consisting of ethylene glycol, 1,2-propanediol, 1,3-propanediol, 1,3-butanediol, 1,4-butanediol, neopentyl glycol, pentane diol, 1,6-hexane diol, 1,8-octane diol, 1,10-decane diol, 4,4'-dihydroxy phenyl propane, 4,4'-dihydroxy methyl methane, diethylene glycol, triethylene glycol, polyethylene glycol (PEG), dipropylene glycol, poly tetra methylene glycol (PTMG), polypropylene glycol (PPG), 1,4-cyclohexane dimethanol, 1,4-cyclohexane diol, bisphenol A, bisphenol F, glycerin, 1,1,1-trimethylolpropane, 1,2,5-hexatriol, pentaerythriol, glucose, sucrose, and sorbitol. Among these, the polyol may be at least one selected from a group consisting of poly tetra methylene glycol (PTMG), polypropylene glycol (PPG), and polyethylene glycol (PEG).

Moreover, the polyether polyol may be obtained by adding an alkylene oxide to polyalcohol through a ring-opening polymerization of the alkylene oxide. The polyalcohol may be, for example, ethylene glycol, diethylene glycol, propylene glycol, dipropylene glycol, glycerin, trimethylolpropane or the like, or a combination of two or more thereof may be used.

Further, the polycarbonate polyol may be at least one selected from a group consisting of, for example, poly (hexamethylene carbonate) glycol and poly (cyclohexane carbonate) glycol.

Meanwhile, the isocyanate is not limited, as long as it is a compound having two or more NCO groups. For example, the isocyanate may be one selected from a group consisting of toluene diisocyanate (TDI), 4,4-diphenyl methane diisocyanate (MDI), 1,5-naphthalene diisocyanate (NDI), tolidine diisocyanate (TODI), hexamethylene diisocyanate (HMDI), isopron diisocyanate (IPDI), p-phenylene diisocyanate, trans-cyclohexane, 1,4-diisocyanate and xylene diisocyanate (XDI), or a combination of two or more thereof.

In addition, the polyurethane resin may include a carboxyl or tertiary amine group. When the polyurethane resin includes a carboxyl or tertiary amine group, dispersibility thereof in water is improved and adhesion thereof to the polarizer is enhanced. Meanwhile, the polyurethane resin including a carboxyl or tertiary amine group may be manufactured by reacting the polyester polyol with the isocyanate through an addition of a chain lengthener having a free carboxyl group or free amine group. In this case, the chain lengthener having the free carboxyl group may be dihydroxy carboxylic acid, dihydroxy succinic acid, or the like. The dihydroxy carboxylic acid may be, for example, dialkylol alkanoic acid including dimetylol alkanoic acid such as dimethylol acetic acid, dimethylol butanoic acid, dimethylol propionic acid, dimethylol butyric acid, dimethylol pentanoic acid or the like. These dimethylol acids may be used alone or in combination of two or more thereof. Meanwhile, the chain lengthener having the glass amine group may be, for example, aliphatic diamine such as ethylene diamine, propylene diamine, hexamethylene diamine, 1,4-butane diamine, aminoethylethanolamine or the like; alicyclic diamine such as isophorone diamine, 4,4'-dicyclohexyl methane diamine or the like; or aromatic diamine such as xylylene diamine, tolylene diamine or the like. These diamine compounds may be used alone or in combination of two or more thereof.

Meanwhile, the polyurethane resin may have a weight-average molecular weight of 10,000 to 1,000,000. When the weight-average molecular weight of the polyurethane resin satisfies the numerical range, a sufficient degree of adhesive strength may be implemented and water dispersibility may be excellent.

Meanwhile, the polyurethane resin usable in the embodiment of the present invention may be manufactured using any appropriate method known in the technical field of the present invention. In particular, the method may be a one-shot method of reacting individual components at the same time or a multi-stage method of reacting individual components in a stepwise manner. When the polyurethane resin includes a carboxyl or tertiary amine group, it may be manufactured by the multi-stage method. It is because that the carboxyl group may be easily introduced using the multi-stage method. Further, any appropriate urethane reaction catalyst may be used at the time of manufacturing the polyurethane resin.

Further, the polyurethane resin may include other polyols or chain lengtheners in addition to the components, as long as properties of the film according to the present invention are not vitiated thereby.

Here, other polyols may be polyols including three or more hydroxyl groups such as sorbitol, glycerin, trimethylolethane, trimethylolpropane, or pentaerythritol, and the like.

In addition, other chain lengtheners may be glycol types such as ethylene glycol, diethylene glycol, triethylene glycol, 1,3-propanediol, 1,3-butanediol, 1,4-butanediol, neopentyl glycol, pentane diol, 1,6-hexane diol or propylene glycol, and the like.

Meanwhile, the polyurethane resin may further include a neutralizing agent, if necessary. In the case of including the neutralizing agent, stability of the urethane resin in water may be improved. The neutralizing agent may be, for example, ammonia N-methylmorpholine, triethylamine, dimethyl ethanol amine, methyl diethanolamine, triethanol alkyne, morpholine, tripropylamine, ethanolamine, triisopropanol amine or the like, or a combination of two or more thereof may be used.

Further, the polyurethane resin may be fabricated in an organic solvent, inactive with respect to the isocyanate and compatible with water. The organic solvent may be an ester solvent such as aceteic acid athyl, ethyl cellosolve acetate or the like; a ketone solvent such as acetone, methyl ethyl ketone, methyl isobutyl ketone or the like; or an ether solvent such as dioxane tetrahydrofuran or the like, or a combination of two or more thereof may be used.

Next, the acrylic resin may be a polymer including acrylic acid, methacrylic acid and derivates thereof. For example, the acrylic resin may be a polymer including, as main components, for example, acrylic acid, methacrylic acid, methyl methacrylate, ethyl acrylate, butyl acrylate, 2-ethylhexyl acrylate, acrylamide, acrylonitrile, hydroxy acrylate and the like, and monomers copolymerizable with the components, for example, styrene, divinylbenzene or the like, copolymerized with the components.

In particular, the first polymer resin included in the coating composition according to the embodiment of the present invention may be a polyester-polyurethane resin formed by the reaction between the polyester polyol and the isocyanate. In addition, the first polymer resin may be a mixture of the polyurethane resin and the acrylic resin. When the first polymer resin included in the coating composition is the polyester-polyurethane resin or the mixture of the polyurethane resin and the acrylic resin, solvent resistance in the coating composition may be excellent, such that the surface coating layer, a functional layer, may be advantageously formed.

More specifically, when the first polymer resin is the mixture of the polyurethane resin and the acrylic resin, a weight ratio of the polyurethane resin and the acrylic resin may be between 10:1 and 1:1, or between 5:1 and 2:1. When the weight ratio of the polyurethane resin and the acrylic resin satisfies the numerical range, solvent resistance may be secured while excellent coating properties may be obtained.

Furthermore, the second polymer resin included in the primer composition may be the polyurethane resin. When a polyurethane polymer is used as the second polymer resin, transparency of the protective film is significantly high and adhesion strength between the protective film and the polarizer may be excellent, such that high levels of adhesion of the polarizing plate including the primer layer formed using the primer composition described above may be easily ensured.

Meanwhile, the first polymer resin and/or the second polymer resin according to the embodiment of the present invention may further include additional components in addition to the components, as long as properties of the film according to the present invention are not vitiated thereby.

Next, the first cross-linking agent and the second cross-linking agent included in the coating composition and the primer composition may be at least one selected from a group consisting of, for example, an oxazoline cross-linking agent, an organosilane cross-linking agent, a blocked isocyanate cross-linking agent, a carbodiimide cross-linking agent, an organic titanate cross-linking agent, an organic zirconate cross-linking agent and an epoxy cross-linking agent, but is not limited thereto. Since the cross-linking agents may be dissociated or reacted at a predetermined temperature or greater, thereby being advantageously used as a one-component coating agent.

In the embodiment of the present invention, the first cross-linking agent included in the coating composition may be included in an amount of 0.5 to 6 parts by weight, 0.5 to 4 parts by weight, or 1 to 3.5 parts by weight, with respect to 100 parts by weight of the coating composition. When the amount of the first cross-linking agent included in the coating composition satisfies the numerical range, coating properties and storage stability of the coating liquid may be excellent. In particular, since solvent resistance is improved in accordance with an increase in the amount of the first cross-linking agent, when the surface coating layer is formed on the coating layer formed using the coating composition, adhesiveness between the coating layer and the surface coating layer may be significantly improved. In addition, slip properties of the protective film may be improved.

The primer composition according to the embodiment of the present invention may not include the second cross-linking agent, but may include the second cross-linking agent if necessary. When the second cross-linking agent is included in the primer composition, the second cross-linking agent is included in an amount of 0.5 to 3 parts by weight or 1 to 2 parts by weight with respect to 100 parts by weight of the primer composition. When the amount of the second cross-linking agent included in the primer composition satisfies the numerical range, coating properties and storage stability of the primer composition may be excellent and excellent adhesion with respect to the acrylic film and an adhesive may be obtained. In particular, in the case of using a non-aqueous adhesive as the adhesive, when the primer composition of the present invention, including the second cross-linking agent having the content range described above is used, adhesion of the primer layer with respect to the polarizer and the acrylic film may be further enhanced and slip properties thereof may be further improved.

Then, in the coating composition according to the embodiment of the present invention, the first water dispersible particles may be included in an amount of 0.1 to 3 parts by weight, 0.2 to 2.5 parts by weight, or 0.5 to 1.5 parts by weight, with respect to 100 parts by weight of the coating composition. When the amount of the first water dispersible particles in the coating composition satisfies the numerical range, slipping between portions of the film may be smoothly performed and anti-blocking properties may be improved to increase rolling properties of the film at the time of rolling the film, and a defect ratio of the film after the rolling thereof may be significantly improved. In addition, scratch resistance is improved and due to a low haze value, transparency of the film may be advantageously high.

In addition, in the primer composition according to the embodiment of the present invention, the second water dispersible particles may be included in an amount of 0.1 to 3 parts by weight, 0.2 to 3 parts by weight, or 0.5 to 3 parts by weight. When the amount of the second water dispersible particles in the primer composition satisfies the numerical range, slipping between portions of the film may be smoothly performed and anti-blocking properties may be improved to increase rolling properties of the film at the time of rolling the film, and a defect ratio of the film after the rolling thereof may be significantly improved. In addition, scratch resistance is improved and due to a low haze value, transparency of the film may be advantageously high.

As the first water dispersible particles and the second water dispersible particles usable in the coating composition and the primer composition, any appropriate particles may be used, and for example, inorganic particles, organic particles, or combinations thereof, may be used. The inorganic particles may be, for example, inorganic oxides such as silica, titania, alumina, zirconia and antimony particles, and the like. In addition, the organic particles may be, for example, silicon resins, fluorinated resins, (meth)acrylic resins, cross-linked polyvinyl alcohol, melamine resins and the like.

In particular, in the coating composition and the primer composition forming the coating layer and the primer layer included in the protective film according to the embodiment of the present invention, as the first water dispersible particles and the second water dispersible particles, silica may be used. Since silica is highly capable of suppressing blocking and has high levels of transparency, haze is rarely generated therein and coloring thereof is not caused, thereby slightly influencing optical properties of the polarizing plate. In addition, since colloidal silica has good dispersibility and dispersion stability in the coating composition and the primer composition, it has high workability at the time of forming the coating layer or the primer layer.

Meanwhile, the first water dispersible particles and the second water dispersible particles may have an average diameter (an average primary particle diameter) of about 50 nm to 500 nm or about 100 nm to 300 nm. When the average diameter of the first water dispersible particles and the second water dispersible particles satisfies the numerical range, the coating liquid and the primer liquid may have excellent stability and a uniform dispersion thereof may be enabled, to result in a low haze value, thereby improving transparency of the film. In addition, by using the particles having the diameter within the range described above, unevenness portions may be suitably formed on surfaces of the coating layer and the primer layer, such that frictional force of, in particular, a contact surface between the acrylic film and the primer layer, a contact surface between the acrylic film and the coating layer, a contact layer between the primer layers or a contact layer between the coating layers may be effectively reduced. As a result, blocking may be further effectively suppressed.

The coating composition and the primer composition according to the embodiment of the present invention are aqueous compositions, and thus, the particles may be provided as water-dispersible materials and mixed in the compositions. Specifically, in a case in which silica is used as the material of the particles, colloidal silica may be preferably mixed in the compositions. As the colloidal silica, a product commercially available in the technical field of the present invention may be used as it is, and examples of the colloidal silica may include Snowtex series by Nissan Chemical Industries, Ltd., Aerosil series of Air Products, Epostar series and Soliostar RA series of Japan catalysts, LSH series of Ranco, and the like.

The coating layer formed using the coating composition described above may have improved adhesive properties with respect to the surface coating layer and excellent slip properties. In addition, the primer layer formed using the primer composition described above may have excellent adhesion with respect to the acrylic film and the polarizer, and superior durability and transparency.

Meanwhile, in the polarizing plate according to the embodiment of the present invention, the coating layer may be formed by coating the coating composition on one surface of the transparent film, and the primer layer may be formed by coating the primer composition on the other surface of the transparent film, opposite to the one surface thereof on which the coating layer is formed.

At the time of forming the coating layer, drying thereof may be performed in a convection oven or the like, but is not limited thereto. The coating layer may be dried at a temperature of 90° C. to 150° C. for 10 seconds to 5 minutes. The drying temperature may be varied depending on a coating step. In a case in which stretching of a film has been completed, the drying thereof may be performed within a temperature range equal to or less than a glass transition temperature Tg of the film. In a case in which the film is stretched during the coating step, the drying thereof may be simultaneously performed with the stretching thereof at a stretching temperature, within a range equal to or less than a decomposition temperature Td of the film.

Meanwhile, as necessary, in order to improve adhesive strength or adhesion, a surface treatment such as an alkali treatment, a corona treatment, a plasma treatment or the like may be performed on at least one surface of the coating layer or the primer layer.

In the polarizing plate according to the embodiment of the present invention, the coating layer and the primmer layer may have a thickness of 50 nm to 2000 nm, 100 nm to 1000 nm, or 200 nm to 800 nm. When the thickness of each of the coating layer and the primer layer satisfies the numerical range, adhesive properties, adhesion and rolling properties may be excellent.

In the polarizing plate according to the embodiment of the present invention, the coefficient of kinetic friction of the coating layer and the primer layer may be 0 to 0.6, but is not limited thereto. As the coefficient of kinetic friction of the coating layer is lowered, slip properties thereof may be superior. When the coefficient of kinetic friction of the coating layer satisfies the numerical range, rolling properties thereof may be excellent. Further, when the coefficient of kinetic friction of the primer layer satisfies the numerical range, blocking is not generated. In this case, the coefficient of kinetic friction refers to a relative ratio obtained by dividing frictional force by normal force.

In the polarizing plate according to the embodiment of the present invention, haze (turbidity) of the coating layer and the primer layer may be 0 to 5 or 0.1 to 3. A lowering in haze of the coating layer and the primer layer may be advantageous, and when the haze satisfies the numerical range, transparency of the film may be excellent.

In the polarizing plate according to the embodiment of the present invention, the transparent film may be formed of a single film or may have two or more films stacked therein. In the case in which the transparent film has two or more films stacked therein, the stacked films may be formed of the same material or different materials.

More specifically, the transparent film may be preferably, an acrylic film, and may include a (meth)acrylate resin. The film including the (meth)acrylate resin may be obtained by, for example, extrusion-molding a material containing the (meth)acrylate resin as a main component.

In addition, the (meth)acrylate resin includes a resin including a (meth)acrylate unit as a main component, and a concept of the (meth)acrylate resin may include a copolymer resin copolymerized with other monomer units in addition to the (meth)acrylate unit and a blend resin having other resins blended with the (meth)acrylate resin, as well as a homopolymer resin formed of the (meth)acrylate unit.

In this case, the (meth)acrylate unit may be, for example, an alkyl (meth)acrylate unit. Here, the alkyl (meth)acrylate unit refers to all of an alkyl acrylate unit and an alkyl methacrylate unit, and an alkyl group of the alkyl (meth)acrylate unit may have 1 to 10 carbon atoms, preferably, 1 to 4 carbon atoms.

Meanwhile, examples of the monomer unit copolymerizable with the (meth)acrylate unit may include an aromatic vinyl unit, a 3 to 6-membered hetero ring unit substituted with a carbonyl group, an acrylic acid unit, a glycidyl unit and the like.

The aromatic vinyl unit may be a unit derived from at least one monomer selected from a group consisting of styrene, α-methyl styrene, 3-methyl styrene, 4-methyl styrene, 2,4-dimethyl styrene, 2,5-dimethyl styrene, 2-methyl-4-chloro-styrene, 2,4,6-trimethyl styrene, cis-β-methyl styrene, trans-β-methyl styrene, 4-methyl-α-methyl styrene, 4-fluoro-α-methyl styrene, 4-chloro-α-methyl styrene, 4-bromo-α-methyl styrene, 4-t-butyl styrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromo-styrene, α-bromostyrene, β-bromostyrene, 2-hydroxystyrene and 4-hydroxystyrene, but is not limited thereto. Among these, the aromatic vinyl unit may be, preferably, a unit derived from styrene or α-methyl styrene.

Meanwhile, the 3 to 6-membered hetero ring unit substituted with a carbonyl group may be a unit derived from monomers such as a lactone ring, a glutaric anhydride, glutarimid, a maleic anhydride, maleimide and the like.

Meanwhile, the resin that may be blended with the (meth)acrylate resin is not particularly limited and for example, may be a phenoxy resin, a polycarbonate resin or the like.

A manufacturing method of the (meth)acrylate resin film is not particularly limited, but the (meth)acrylate resin film may be manufactured in such a manner that the (meth)acrylate resin, a polymer, an additive, and the like are sufficiently mixed through any appropriate mixing method to fabricate a thermoplastic resin composition and the composition is then formed as a film, or may be manufactured in such a manner that the (meth)acrylate resin, a polymer, an additive, and the like are fabricated as separate solutions and mixed with each other to form a uniform mixture and the mixture is then formed as a film.

The thermoplastic resin composition may be fabricated by extrusion-kneading a mixture obtained by free-blending a raw material of the film using any appropriate blender such as an Omni blender or the like. In this case, the blender used in the extrusion-kneading is not particularly limited, and for example, any appropriate blender including an extruder such as a single screw extruder or a twin screw extruder or a pressing kneader, may be used therefor.

A forming method of the film may be any appropriate method of forming a film, such as a solution casting method (solution flexibilization method), a melt extruding method, a calendar method, an extrusion molding method, or the like. Among these forming methods of the film, the solution casting method (solution flexibilization method), and the melt extruding method may be preferable.

Examples of a solvent used in the solution casting method (solution flexibilization method) may include an aromatic hydrocarbon solvent such as benzene, toluene, xylene or the like; an aliphatic hydrocarbon solvent such as cyclohexane, decaline or the like; an ester solvent such as aceteic acid ethyl, aceteic acid butyl or the like; a ketone solvent such as acetone, methyl ethyl ketone, methyl isobutyl ketone or the like; an alcohol solvent such as methanol, ethanol, isopropanol, butanol, isobutanol, methyl cellosolve, ethyl cellosolve, butyl cellosolve or the like; an ether solvent such as tetrahydrofuran, dioxane or the like; a halogenated hydrocarbon solvent such as dichloromethane, chloroform, carbon tetrachloride or the like; dimethyl formamide; dimethyl sulfoxide, and the like. These solvents may be used alone and in combination of two or more thereof.

An apparatus for performing the solution casting method (solution flexibilization method) may be, for example, a drum-type casting machine, a band-type casting machine, a spin coater or the like. The melt extruding method may be for example, a T-die method, an inflation method or the like. A forming temperature may be 150 to 350° C. and preferably, may be 200 to 300° C.

In the case of forming the film using the T-die method, a T-die is mounted on a leading edge of a single screw extruder or a twin screw extruder and a film extruded to have a film shape is rolled to thereby obtain a roll-shaped film. In this case, the rolled film may be stretched in an extruding direction and thus, may be uniaxially stretched by appropriately adjusting a temperature of the rolled film. In addition, the film is stretched in a direction perpendicular to the extruding direction, such that simultaneous biaxial stretching and successive biaxial stretching thereof and the like may be performed.

The acrylic film may be a non-stretched film or a stretched film. In the case of the stretched film, the stretched film may be a uniaxially stretched film or a biaxially stretched film. In the case of the biaxially stretched film, the biaxially stretched film may be a simultaneously biaxially stretched film or a successively biaxially stretched film. In the case in which the film is biaxially stretched, mechanical strength thereof may be enhanced and performance thereof may be improved. The acrylic film may be mixed with other thermoplastic resins, such that an increase in phase difference may be suppressed even in the case of stretching the film, and optical isotropy thereof may be maintained.

A stretching temperature may be within a range around a glass transition temperature of the thermoplastic resin composition, the raw material of the film. The stretching temperature may preferably be within a range of (glass transition temperature−30° C.) to (glass transition temperature+100° C.), more preferably within a range of (glass transition temperature−20° C.) to (glass transition temperature+80° C.). When the stretching temperature is lower than (glass transition temperature−30° C.), a sufficient stretching ratio may not be obtained. On the contrary, when the stretching temperature is greater than (glass transition temperature+100° C.), flowage (flow) of the resin composition may occur, such that stable stretching may not be carried out.

A stretching ratio defined by an area ratio may be preferably 1.1 to 25 times, more preferably 1.3 to 10 times. When the stretching ratio is lower than 1.1 times, improvements in strength, accompanied with the stretching may not be generated. When the stretching ratio is greater than 25 times, effects in an amount corresponding to an increase in the stretching ratio may not be admitted.

A stretching speed may be 10~20,000%/min, preferably, 100~10.000%/min, in one direction. When the stretching speed is less than 10%/min, a relatively long period of time is required in order to obtain a sufficient stretching ratio, causing an increase in manufacturing costs. When the stretching speed is greater than 20,000%/min, a fracture of the stretched film may be generated.

The acrylic film may be subjected to a thermal treatment (annealing) after the stretching thereof, in order to stabilize optical isotropy thereof or mechanical properties. Conditions for the thermal treatment are not particularly limited, and any appropriate conditions commonly known in the art may be employed.

Next, a polarizing plate according to an embodiment of the present invention will be described in detail.

The polarizing plate according to the embodiment of the present invention includes a polarizer and the above-described protective film of the present invention, stacked on both surfaces of the polarizer, and may selectively further include the surface coating layer on one surface of the polarizing plate.

The polarizer is not particularly limited, and may be a polarizer commonly known in the technical field, for example, a film formed of polyvinyl alcohol (PVA) including iodine or a dichroic dye. The polarizer may be fabricated by adsorbing iodine or a dichroic dye onto a PVA film, but the fabricating method thereof is not particularly limited. In the specification, the polarizer does not include the protective film, while the polarizing plate includes the polarizer and the protective film.

In the polarizing plate according to the embodiment of the present invention, an adhesive layer may be further included on one surface or both surfaces of the polarizer. An adhesive usable in the forming of the adhesive layer may be an aqueous adhesive or a non-aqueous adhesive.

In this case, the aqueous adhesive may be used without limitation, as long as it is commonly known in the art. However, the aqueous adhesive may be a PVA adhesive. In particular, in the case of using modified PVA including an acetoacetyl group, adhesive properties thereof may be further enhanced. More particularly, Gohsefimer (Trade name) Z-100, Z-200, Z-200H, Z-210, Z-220, Z-320 and the like, by The Nippon synthetic Chemical Industry Co., Ltd., may be used, but the adhesive is not limited thereto.

Here, adhesion between the polarizer and the protective film using the aqueous adhesive may be performed in such a manner that the aqueous adhesive is first coated on a surface of the protective film for the polarizer or a surface of the PVA film, the polarizer, using a roll coater, a gravure coater, a bar coater, a knife coater, a capillary coater or the like, and then the protective film and the polarizer are heat-pressed or pressed at room temperature using a laminated roll before the adhesive is completely dried, thereby being laminated. In the case of using a hot melt adhesive, a heat-pressing roll needs to be used.

Meanwhile, the non-aqueous adhesive is not particularly limited, as long as it is a UV-curable adhesive. However, the non-aqueous adhesive may be an adhesive using an optical radical polymerization, such as a (meth)acrylate adhesive, an ene/thiol adhesive, or an unsaturated polyester adhesive; an adhesive using a cationic photopolymerization such as an epoxy adhesive, an oxetane adhesive, an epoxy/oxetane adhesive, or a vinyl ether adhesive, or the like.

Here, adhesion between the polarizer and the protective film using the non-aqueous adhesive may be performed in such a manner that after an adhesive layer is formed by coating an adhesive composition, the polarizer and the protective film are laminated and then light is irradiated thereon to thereby harden the adhesive composition.

As necessary, the polarizing plate according to the embodiment of the present invention may further include a surface coating layer on one surface thereof. The surface coating layer refers to a functional layer having anti-glare, anti-reflection or hard coating properties.

In the embodiment of the present invention, a surface coating composition forming the surface coating layer is not particularly limited, but may include a binder resin, particles, and a solvent and further include an additive as needed. In this case, the binder resin may be, for example, an acrylic resin and the particles may include organic particles, inorganic particles and the like. In particular, in the embodiment of the present invention, the surface coating composition may be a UV curable type.

The forming method of the surface coating layer may include: coating the surface coating composition and drying and hardening the surface coating composition. In this case, the drying and the hardening may be separately undertaken or may be undertaken in a single process. Here, the hardening may be performed using ultraviolet light.

The polarizing plate according to the embodiment of the present invention may further include a separate layer for other purposes, in addition to the surface coating layer. For example, the polarizing plate may further include a contamination-resistant layer in order to prevent contamination on a display surface and in addition to this, may further include various layers in order to implement various purposes.

The polarizing plate according to the embodiment of the present invention, manufactured as above may be used for various usages. Specifically, the polarizing plate may be used in an image display including a liquid crystal display (LCD)'s polarizing plate, an organic EL display's anti-reflective polarizing plate and the like. In addition, the polarizing plate according to the embodiment of the present invention may be applied to a complex polarizing plate in which various kinds of functional films, for examples, various optical layers including a retardation plate such as a λ/4 plate, a λ/2 plate or the like, a light diffusion plate, a viewing angle expansion plate, a brightness-improvement plate, a reflective plate, and the like are combined.

MODE FOR INVENTION

<Fabricating of Coating Composition>

Fabrication Example 1

28.6 g of CK-PUD-1004A (Chokwang-poly urethane dispersion-1004A: an aqueous solution having a solid content of 30%), 13.7 g of an oxazoline cross-linking agent (an aqueous solution having a solid content of 25%), 3.0 g of colloidal silica (an average particle diameter of 300 nm, an aqueous solution having a solid content of 20%), and 54.7 g of pure water were mixed to thereby fabricate a coating composition (A).

Fabrication Examples 2 to 4

Coating compositions (B) to (D) were fabricated based on constituents and contents described in the following [Table 1], using the same method as that of Fabrication Example 1.

TABLE 1

| Classification | PUD Type | PUD content (g) | Cross-linking Agent Type | Agent content (g) | Silica Type | Silica content (g) | Water (g) |
| --- | --- | --- | --- | --- | --- | --- | --- |
| Fabrication Example 1 | CK-PUD-1004A (solid content 30%) | 28.6 | Oxazoline based- (solid content 25%) | 13.7 | 300 nm (solid content 20%) | 3.0 | 54.7 |
| Fabrication Example 2 | VTW1265 (solid content 36%) | 27.8 | Oxazoline based- (solid content 25%) | 8.0 | 300 nm (solid content 20%) | 3.0 | 61.2 |
| Fabrication Example 3 | CK-PUD-1004A (solid content 30%) | 33.3 | Carbodiimide based (solid content 40%) | 5 | 300 nm (solid content 20%) | 3.0 | 58.7 |
| Fabrication Example 4 | CK-PUD-1004A (solid content 30%) | 40 | — | | 300 nm (solid content 20%) | 3.0 | 57.0 |

Fabricating of Primer Composition

Fabrication Example 5

17.9 g of CK-PUD-PF (Chokwang-poly urethane dispersion-PF: an aqueous solution having a solid content of 30%), 6.5 g of an oxazoline cross-linking agent (an aqueous solution having a solid content of 25%), 7.0 g of colloidal silica (an average particle diameter of 100 nm, an aqueous solution having a solid content of 20%), and 68.6 g of pure water were mixed to thereby fabricate a primer composition (AA).

Fabrication Examples 6 and 7

Primer compositions (BB) to (CC) were fabricated based on constituents and contents described in the following [Table 2], using the same method as that of Fabrication Example 6.

TABLE 2

| Classification | PUD | | Cross-linking Agent | | Silica | | Water (g) |
|---|---|---|---|---|---|---|---|
| | Type | content (g) | Type | content (g) | Type | content (g) | |
| Fabrication Example 5 | AA CK-PUD-PF (solid content 30%) | 17.9 | Oxazoline based- (solid content 25%) | 6.5 | 100 nm (solid content 20%) | 7.0 | 68.6 |
| Fabrication Example 6 | BB CK-PUD-PF (solid content 30%) | 17.7 | Carbodiimide based (solid content 40%) | 2.5 | 100 nm (solid content 20%) | 7.0 | 72.8 |
| Fabrication Example 7 | CC CK-PUD-PF (solid content 30%) | 23.3 | | | 100 nm (solid content 20%) | 7.0 | 69.7 |

In [Table 1] and [Table 2], CK-PUD-1004A and CK-PUD-PF are polyurethane polymer resins and are provided as Chokwang-poly urethane dispersions.

VTW1265 is a urethane-acrylic resin and is provided as a product of Daotan® by Cytec.

Example 1

After a non-stretched film having a width of 800 mm was fabricated with a poly (cyclohexyl maleimide-co-methyl methacrylate, PMMA830HR by LG MMA Co., Ltd) resin using a T-die film-forming apparatus under conditions of 250° C. and 250 rpm, a film that has been stretched at a stretching ratio of 1.8 times in an MD direction under conditions of 135° C. was fabricated, and a corona treatment was performed on both surfaces of the film prior to coating thereof under conditions of 50 W/m²/min.

Thereafter, the primer composition (AA) manufactured according to the Fabrication Example was coated on one surface of the corona-treated acrylic film and was then dried at a temperature of 90° C. for 1 minute. After coating the coating composition (A) manufactured according to the Fabrication Example on the other surface of the film, the film was stretched in a TD direction at a temperature of 135° C. to fabricate an acrylic film having a primer layer and a coating layer formed thereon. In this case, a thickness of the primer layer was 300 nm and a thickness of the coating layer was 600 nm.

Next, after an acryl-based UV curable surface treatment solution was coated on the surface of the acrylic film, having the coating layer coated thereon, and was hot-air dried at a temperature of 60° C. for 2 minutes, a UV curing treatment was performed thereon to thereby fabricate an acrylic film on which an anti-glare surface coating layer was formed.

Then, an adhesive was applied to both surfaces of a PVA element, and the acrylic film having the anti-glare surface coating layer formed thereon was laminated on the PVA element to thereby manufacture a polarizing plate. In this case, the lamination was performed in a sequence of the anti-glare surface coating layer/the polarizer/the acrylic film, in order that the anti-glare surface coating layer was disposed on an outermost surface of the polarizing plate. Next, after setting conditions such that a final adhesive layer had a thickness of 1 to 2 μm, the final adhesive layer passed through a laminator. Then, ultraviolet light was irradiated onto a surface of the polarizer, on which the acrylic film was laminated, using an UV irradiating apparatus, to thereby manufacture a polarizing plate.

Example 2

A polarizing plate was manufactured using the same method of that of Example 1, with the exception that the coating composition (B) was used as the coating composition.

Example 3

A polarizing plate was manufactured using the same method of that of Example 1, with the exception that the coating composition (C) was used as the coating composition.

Example 4

A polarizing plate was manufactured using the same method of that of Example 1, with the exception that the primer composition (BB) was used as the primer composition.

Example 5

A polarizing plate was manufactured using the same method of that of Example 1, with the exception that the coating composition (B) was used as the coating composition and the primer composition (BB) was used as the primer composition.

Example 6

A polarizing plate was manufactured using the same method of that of Example 1, with the exception that the coating composition (C) was used as the coating composition and the primer composition (CC) was used as the primer composition.

Comparative Example 1

A polarizing plate was manufactured using the same method of that of Example 1, with the exception that the coating layer and the primer layer were not formed.

Comparative Example 2

A polarizing plate was manufactured using the same method of that of Example 1, with the exception that the coating composition (D) was used as the coating composition.

Comparative Example 3

A polarizing plate was manufactured using the same method of that of Example 1, with the exception that the primer composition (AA) was used at the time of forming the coating layer.

Comparative Example 4

A polarizing plate was manufactured using the same method of that of Example 1, with the exception that the coating layer and the primer layer are respectively formed to have a thickness of 30 nm.

Experimental Example 1

Evaluation of Peeling Force in Polarizing Plate

Peeling force of the polarizer and the acrylic film were measured with respect to the polarizing plates manufactured according to Examples 1 to 6 and Comparative Examples 1 to 4. Peeling Tests were performed by measuring peeling force of the respective polarizing plates having a width of 20 mm and a length of 100 mm when they are peeled off at an angle of 90°, at a rate of 300 mm/min. The results are shown in the following [Table 3]. A case in which peeling force exceeded 2N/cm is represented by "OK" and a case in which peeling force was equal to or less than 2N/cm is represented by "NG".

Experimental Example 2

Evaluation of Adhesive Properties

With respect to the acrylic films according to Examples 1 to 6 and Comparative Examples 1 to 4, after 10×10 of cuts having a width of 1 mm were made in the surface coating layer and adhesive tape was attached to the surface coating layer, the tape was peeled off therefrom. In this case, adhesive properties were evaluated based on a degree to which the coating layer was delaminated. A case in which 0 to 20 of partitions were delaminated is represented by "OK" and a case in which 21 or more partitions were delaminated is represented by "NG". The results are shown in the following [Table 3].

TABLE 3

| Classification | Coating Composition | Primer Composition | Peeling Force | Adhesion | Remarks |
|---|---|---|---|---|---|
| Example 1 | A | AA | OK | OK | |
| Example 2 | B | AA | OK | OK | |
| Example 3 | C | AA | OK | OK | |
| Example 4 | A | BB | OK | OK | |
| Example 5 | B | BB | OK | OK | |
| Example 6 | C | BB | OK | OK | |
| Comparative Example 1 | — | — | NG | NG | Primer composition and Coating composition were not coated at all |
| Comparative Example 2 | D | AA | OK | NG | Cross-linking agent was not included in Coating composition |
| Comparative Example 3 | AA | AA | OK | NG | All of coating layer and primer layer were formed using primer composition |
| Comparative Example 4 | A | AA | NG | NG | Each of Coating layer and Primer layer had a reduced thickness (30 nm) |

As shown in [Table 3], in the case of the polarizing plate according to Comparative Example 1 in which the coating layer and the primer layer were not formed at all and the polarizing plate according to Comparative Example 4 in which each of the coating layer and the primer layer had a reduced thickness, neither peeling force nor adhesion were good. In the case of the polarizing plate according to Comparative Example 2 in which the cross-linking agent was not included in the coating composition, peeling force was good while adhesion was poor. Further, in the case of the polarizing plate according to Comparative Example 3 in which all of the coating layer and the primer layer are formed using the primer composition, either peeling force or adhesion was poor.

However, the polarizing plates according to Examples 1 to 6, formed using the coating composition and the primer composition, were excellent in terms of peeling force and adhesion.

Therefore, it may be confirmed that the polarizing plate according to the embodiment of the present invention has excellent adhesion with respect to the surface coating layer while allowing for high levels of adhesive strength between the polarizer and the protective film, thereby enabling a surface coating layer having functionality such as anti-glare and low reflection properties and the like, to be easily formed.

While the present invention has been shown and described in connection with the embodiments, it will be apparent to those skilled in the art that modifications and variations can be made without departing from the spirit and scope of the invention as defined by the appended claims.

The invention claimed is:

1. A protective film, comprising: a transparent film; a coating layer formed on one surface of the transparent film; and a primer layer formed on the other surface of the transparent film,
    wherein the coating layer is formed using a coating composition including a first polymer resin, a first cross-linking agent and first water dispersible particles, and
    the primer layer is formed using a primer composition including a second polymer resin and second water dispersible particles, and a second cross-linking agent in an amount more than 0% by weight, and less than 85% by weight, of the first cross-linking agent, and
    the primer composition includes:
    1 to 20 parts by weight of the second polymer resin;
    0.1 to 3 parts by weight of the second water dispersible particles;
    0.5 to 3 parts by weight of the second cross-linking agent; and
    a remainder of water, with respect to 100 parts by weight of the primer composition.

2. The protective film of claim 1, wherein the coating composition includes:
    1 to 30 parts by weight of the first polymer resin;
    0.5 to 6 parts by weight of the first cross-linking agent;
    0.1 to 3 parts by weight of the first water dispersible particles; and
    a remainder of water, with respect to 100 parts by weight of the coating composition.

3. The protective film of claim 1, wherein the first polymer resin is a polyurethane resin, an acrylic resin, or a combination thereof.

4. The protective film of claim 3, wherein the polyurethane resin has a weight-average molecular weight of 10,000 to 1,000,000.

5. The protective film of claim 1, wherein the second polymer resin is a polyurethane resin, an acrylic resin, or a combination thereof.

6. The protective film of claim 1, wherein the primer layer has a thickness of 50 to 2000 nm.

7. The protective film of claim 1, wherein the coating layer has a thickness of 50 to 2000 nm.

8. The protective film of claim 1, wherein the first cross-linking agent and the second cross-linking agent have a group capable of reacting with a carboxyl group.

9. The protective film of claim 8, wherein the cross-linking agents include at least one selected from a group consisting of an oxazoline cross-linking agent, an organosilane cross-linking agent, a blocked isocyanate cross-linking agent, a carbodiimide cross-linking agent, an organic titanate cross-linking agent, an organic zirconate cross-linking agent, and an epoxy cross-linking agent.

10. The protective film of claim 1, wherein the first water dispersible particles and the second water dispersible particles include at least one selected from a group consisting of silica, titania, alumina, zirconia, and antimony particles.

11. The protective film of claim 1, wherein the transparent film is an acrylic film.

12. The protective film of claim 5, wherein the polyurethane resin has a weight-average molecular weight of 10,000 to 1,000,000.

13. A polarizing plate comprising:
a polarizer; and
the protective film of claim 1 on both surfaces of the polarizer.

14. The polarizing plate of claim 13, further comprising: a surface coating layer on one surface of the polarizing plate.

15. An image display comprising: the polarizing plate of claim 13.

* * * * *